United States Patent [19]
Bonomi

[11] Patent Number: 5,465,868
[45] Date of Patent: Nov. 14, 1995

[54] AUTOMATIC SYSTEM FOR SELECTING AND FEEDING PREORIENTED RIVETS TO RIVETING MACHINES

[75] Inventor: Giovanni B. Bonomi, Caorso, Italy

[73] Assignee: Bears S.r.l., Milan, Italy

[21] Appl. No.: 214,465

[22] Filed: Mar. 18, 1994

[30] Foreign Application Priority Data

Mar. 22, 1993 [IT] Italy .................................. MI93A0540

[51] Int. Cl.⁶ .................................................. B65H 9/00
[52] U.S. Cl. ........................... 221/165; 221/156; 221/2; 221/95; 221/DIG. 1; 227/109; 227/135
[58] Field of Search ................................ 221/156, 150 R, 221/165, 2, 14, 17, 312 B, DIG. 1, 95, 133, 298; 227/78, 109, 119, 135

[56] References Cited

U.S. PATENT DOCUMENTS

| | | | |
|---|---|---|---|
| 2,040,747 | 5/1936 | Koren | 221/156 X |
| 2,818,964 | 1/1958 | Picard et al. | 221/95 X |
| 2,963,883 | 12/1960 | Teesdale | 221/150 R X |
| 3,110,417 | 11/1963 | Wingate et al. | 221/150 R X |
| 4,119,243 | 10/1978 | Marecek et al. | 221/298 |
| 4,501,380 | 2/1985 | Welch | 221/298 |
| 4,653,668 | 3/1987 | Gibilisco et al. | 221/298 |
| 5,207,350 | 5/1993 | Spanton | 221/95 X |
| 5,224,659 | 7/1993 | Gabardi | 221/298 X |
| 5,242,080 | 9/1973 | Kroon et al. | 221/133 X |

FOREIGN PATENT DOCUMENTS

| | | | |
|---|---|---|---|
| 2072633 | 10/1981 | United Kingdom | 221/133 X |

*Primary Examiner*—William E. Terrell
*Assistant Examiner*—Dean A. Reichard
*Attorney, Agent, or Firm*—Wenderoth, Lind & Ponack

[57] ABSTRACT

The system includes a buffer magazine connected to each riveting machine and comprising a bundle of tubes, each of which contains a certain amount of preoriented rivets or like fasteners deliverable one-by-one to the riveting machine, and a stationary main feed station for supplying all of the buffer magazines with rivets. Each buffer magazine contains the entire inventory of rivets used by the riveting machine and quickly satisfies any request for rivets from the riveting machine. The floor-mounted main feed station is activated when the level of rivets in a tube of a buffer reaches a minimum level.

16 Claims, 7 Drawing Sheets

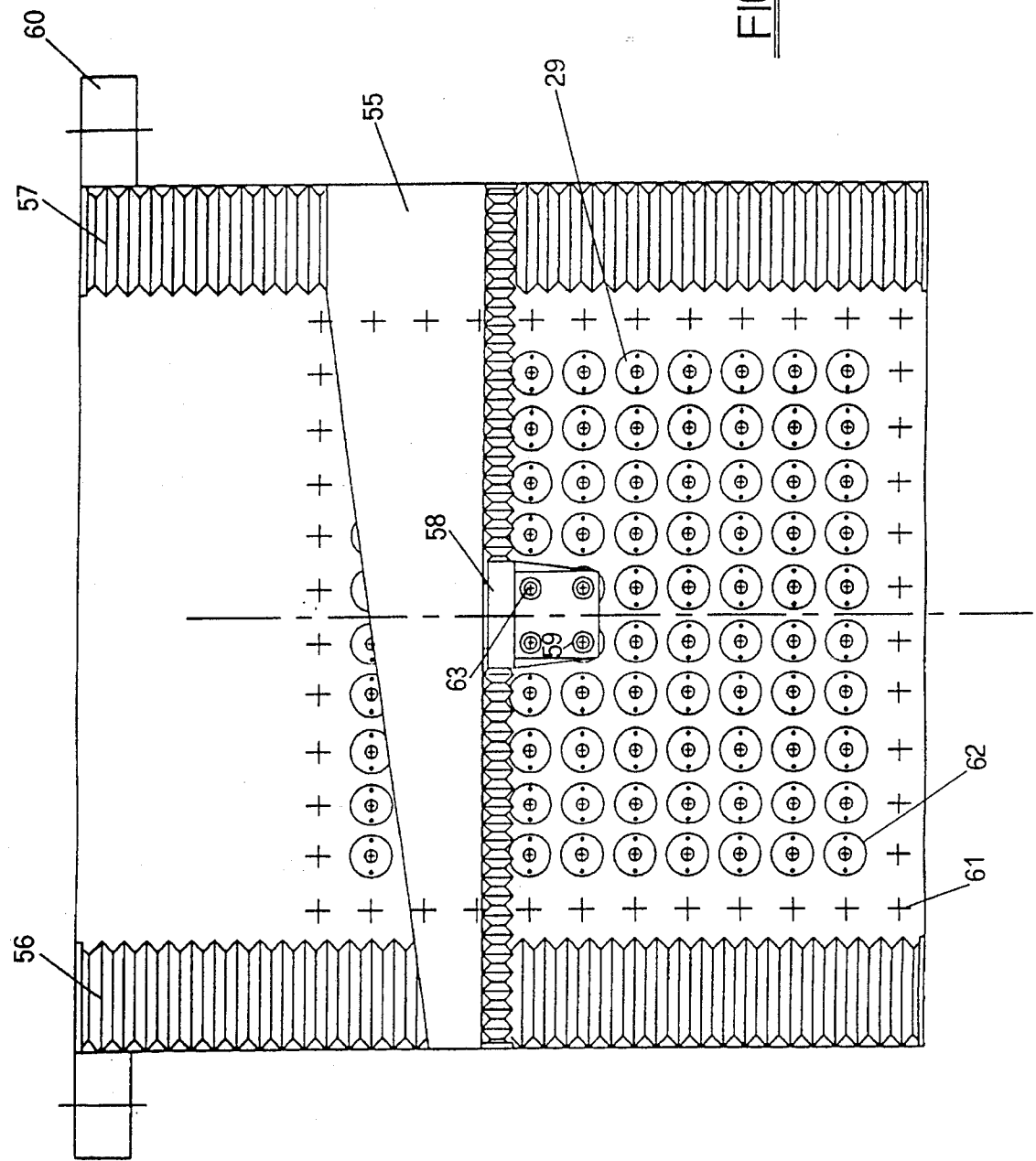

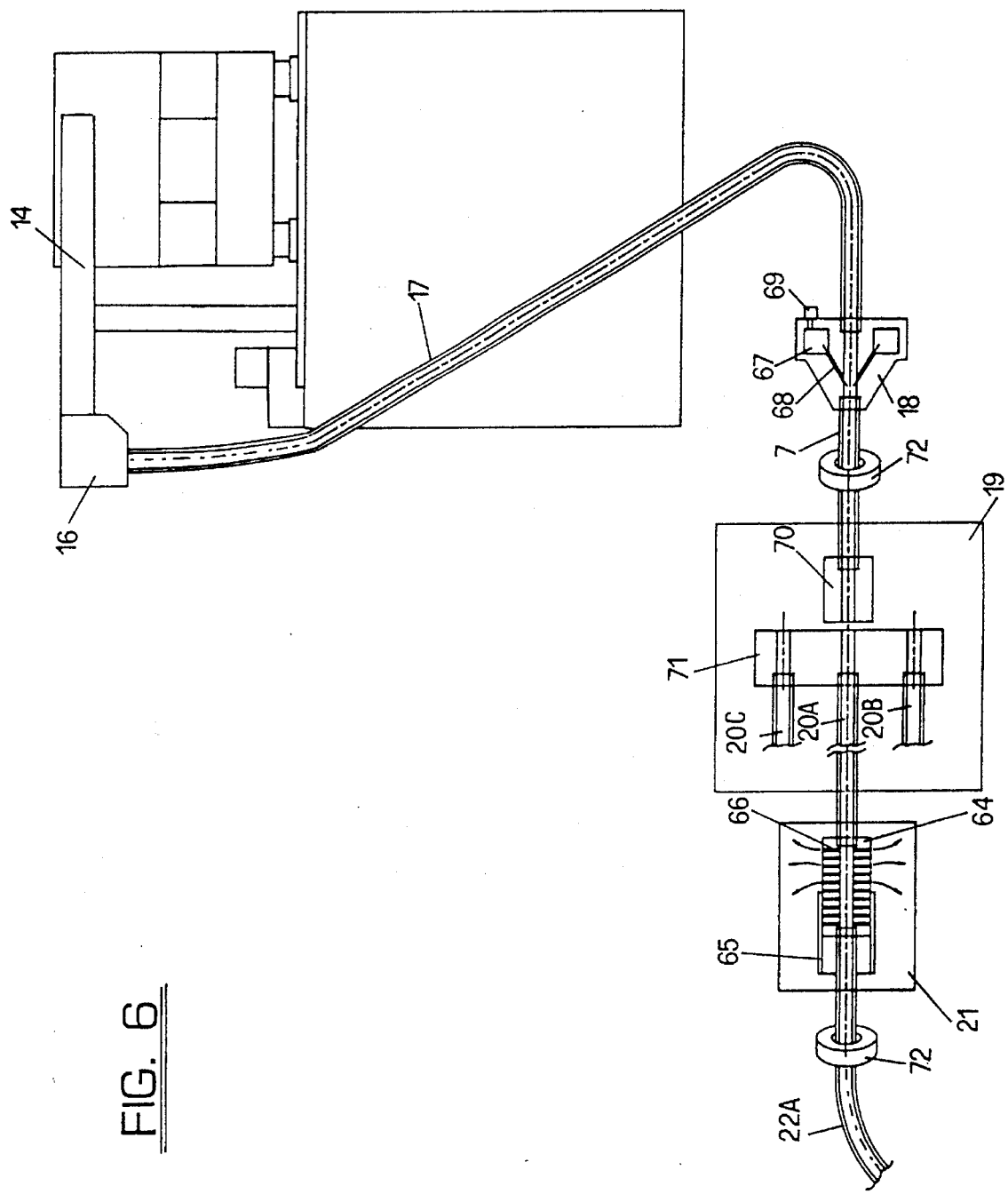

AUTOMATIC SYSTEM FOR SELECTING AND FEEDING PREORIENTED RIVETS TO RIVETING MACHINES

BACKGROUND OF THE INVENTION

1. Field of the Invention

The present invention relates to automatic assembly systems and particularly to a system for the selection and delivery of preoriented rivets or like fasteners to one or more riveting machines.

2. Description of the Related Art

The procedure of assembling parts by means of riveting is used in numerous industries, in particular in the aerospace industry. During the evolution of this technology, a large number of automatic riveting machines have been developed, which according to the parts to be assembled, are able to install different kinds of rivets or like fasteners and for each kind, to finalize the choice of different lengths depending upon the thickness of the sheets to be joined.

Rivets or like fasteners are usually supplied from a suitable rivet feeding system capable of selecting and sending, time after time, the right kind and length of a requested rivet to the riveting machine.

With the development of continuous numeric control (CNC), modern automatic riveting machines are capable of assembling a large number of different parts and of storing the program which assigns the position of each rivet to be installed. The machines are also able to accurately finalize the correct call of the right kind and length of the rivet to be installed.

Typically, the type of rivet to be used is assigned by the designer and stored in the memory of the control while the length is chosen upon measuring, time after time, the thickness of the parts to be connected together.

Rivets are consequently requested with an unpredictable sequence and they must be delivered in a very short time in order to prevent the cycle time from being increased.

Several automatic rivet feed systems are known, in which all rivets of the same kind and same length (identical) are stored inside a vibratory bowl which orients and accumulates the rivets on a track, usually horizontal, whereby rivets are withdrawn one at a time and are pneumatically transferred via a tube to the riveting machine.

In addition to such systems, other automating riveting machines are known, such as spirals or cassettes, in which the different rivets are disposed and preoriented inside a "cartridge". Such magazines feature a certain capacity and usually are mounted close to the riveting machine.

Both these approaches to the problem of automatically feeding a riveting machine by delivering to it, one-by-one, a preoriented rivet selected from a certain inventory of rivets, suffer several drawbacks and/or limitations.

In the systems using a vibrating bowl, each bowl is dedicated to a precise kind and length of the rivet and such systems are consequently very expensive and bulky. In fact, it is sufficient to think of a system capable of handling five different kinds of rivets and for each of them at least ten different grip lengths to have an idea of the costs and size involved. Furthermore, a feed station featuring fifty or more bowls cannot be mounted on a board of the machine due to weight and size limitations, and consequently, the station needs to lie on the floor and to be connected via tubes to the riveting machine with a related performance drop in terms of delivery time.

The "cartridge machines" are, on the one hand, more compact but, on the other hand, they need continuous replacement and involve high costs related to their preparation.

SUMMARY OF THE INVENTION

The main object of the present invention is to provide an inexpensive and reliable system for selecting and automatically feeding preoriented rivets to the automatic riveting machine.

Another object of the present invention is to provide a system capable of delivering rivets to the riveting machine in a particularly short average time, the term "average time" meaning the time from when the machine forwards the rivet call to the instant when the machine receives the desired rivet.

A further object of the present invention is to provide a system capable of feeding several riveting machines simultaneously.

Still a further object of the present invention is to provide a system that is extremely compact and efficient even for applications where it is necessary to automatically handle a very large number of different rivets (e.g. one hundred or more).

To achieve these objects the system for the automatic selection, orientation and feeding of rivets or like fasteners to one or more riveting machines comprises:

- a mobile buffer magazine for each riveting machine and comprising a plurality of magazines each intended to contain a plurality of preoriented rivets of the same kind and the same grip length;
- a main feed station including a plurality of rivet orienting means each capable of supplying in a preoriented and organized manner rivets from an unorganized stack of rivets and supplying them one-by-one;
- first transporting means for transferring rivets or like fasteners from the main feed station to said mobile buffer magazine;
- second transporting means for transferring rivets from the mobile buffer magazines to the related automatic riveting machine;
- the buffer magazine including first positioning means for positioning the outlet of said first transporting means in coaxial alignment with the inlet of each of the magazines, and second positioning means for positioning the inlet of said second transporting means in coaxial alignment with the outlet of each of the magazines; and
- a control unit connected to said plurality of rivet orienting means, and said positioning means.

BRIEF DESCRIPTION OF THE DRAWINGS

The present invention will now be described in greater detail in connection with a preferred embodiment described in conjunction with the accompanying drawings, in which:

FIG. 5 is a schematic top view of a mobile buffer magazine of the system;

FIG. 6 is a schematic diagram of a line for transporting rivets or like fasteners in the system of the present invention;

DETAILED DESCRIPTION OF THE PREFERRED EMBODIMENT

Figure 1:
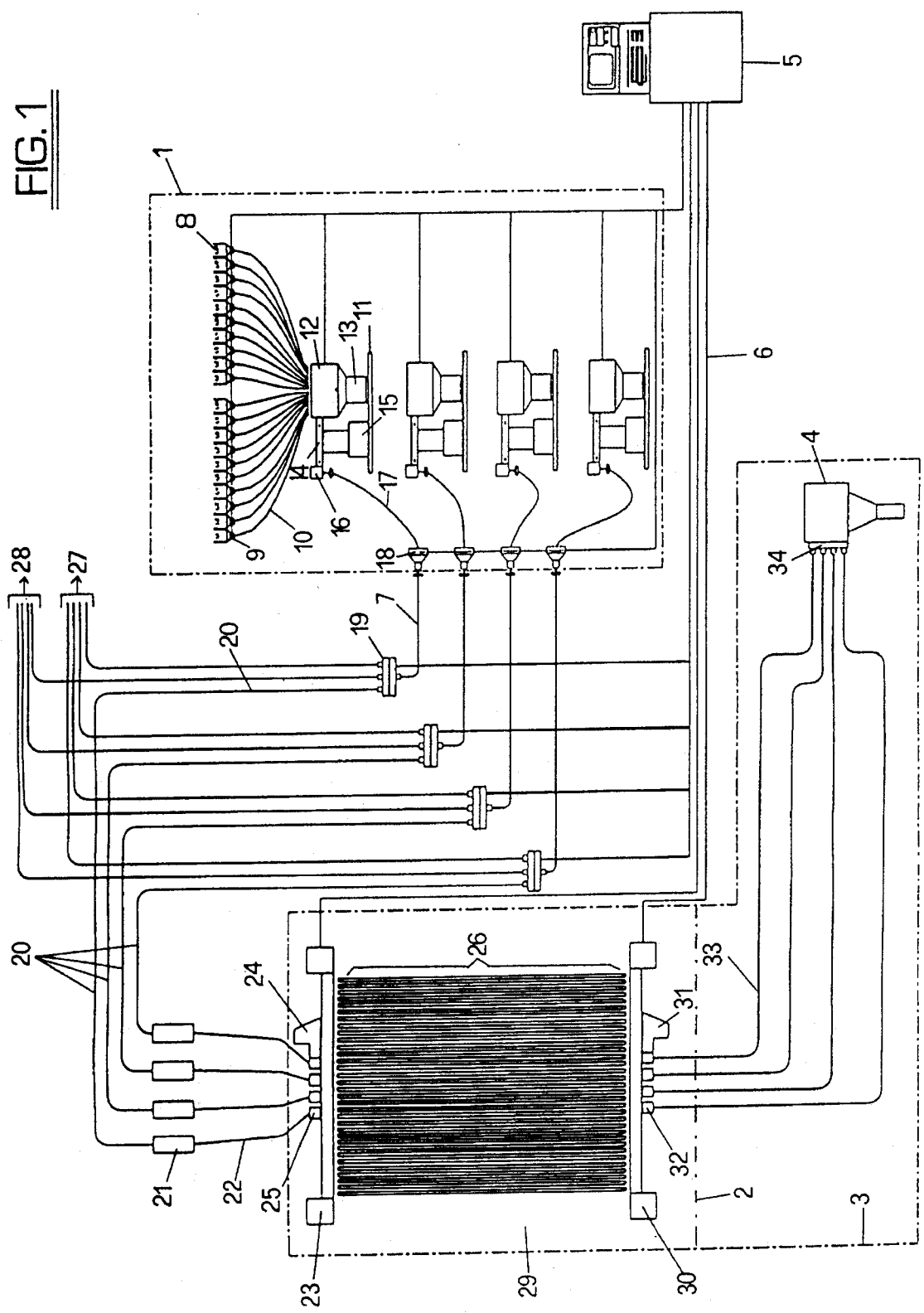
FIG. 1 is a schematic diagram of the rivet selecting and feeding system according to the present invention.

In FIG. 1 there are schematically illustrated a main feed station 1, a mobile buffer magazine 2, an automatic riveting machine 3, a riveting head 4, rivet transporting means 7, 20 and 22 connecting the main feed station 1 to the buffer magazine 2, control means 5 and cables 6 connecting the latter to controlled utilities. The main feed station 1 includes a plurality of hoppers 8 all containing rivets of the same kind but with each separate hopper containing rivets of different grip lengths, a shuttle valve 9 for opening and closing the hoppers 8, rivet orienting devices 11 and transfer tubes 17. Each orienting device 11 comprises a bowl 12 and a related vibrating device 13, a track 14 and related vibrating device 15 and an escapement 16. Numeral 10 designates tubes connecting each hopper 8 to the bowl 12. In the same Figure, the escapement 16 is connected to a distributor 25 of the magazine 2 by tubes 17, 7, 20 and 22, and a booster device 18, a selecting device 19 and a decelerating device 21 are interposed between the tubes, respectively. The same Figure shows how the selecting devices 19 connect the feed station 1 to a plurality of mobile buffer magazines, reference numerals 27 and 28 designating two additional buffer magazines (not shown in the Figure) to which the feed station 1 is connected.

Still referring to FIG. 1, there are shown the main elements of the buffer magazine 2, namely an upper selecting device 23 equipped with a mobile transverse frame 24 and distributor 25, a tube bundle 26 comprising a plurality of single tubes 29 disposed in an organized arrangement, a lower selecting device 30 equipped with a mobile transverse frame 31, and a distributor 32. Furthermore, FIG. 1 shows a rivet receiving unit 34 of the riveting head 4 and tubes 33 dedicated to transfer the rivets or like fasteners from the mobile buffer magazine 2 to the riveting head 4.

Figure 2A:
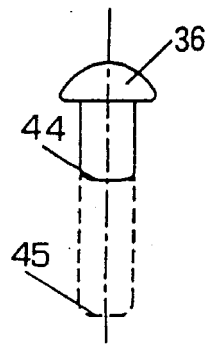
FIGS. 2(a) and 2(b) show typical families of rivets used in the system.
Figure 2B:
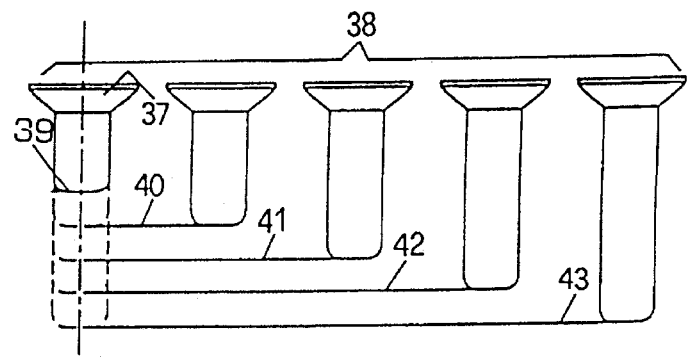

FIGS. 2(a) and 2(b) show two different kinds of rivets 36 and 37. Numeral 38 indicates the typical family of rivets of the same kind 37 but with different grip lengths; in particular the shortest rivet 39, the longest rivet 43 and all other rivets 40, 41, and 42 having intermediate lengths. Reference numerals 44 and 45 indicate the minimum and maximum length of a rivet 36, respectively, while for sake of simplicity the intermediate lengths are not shown.

Figure 3A:
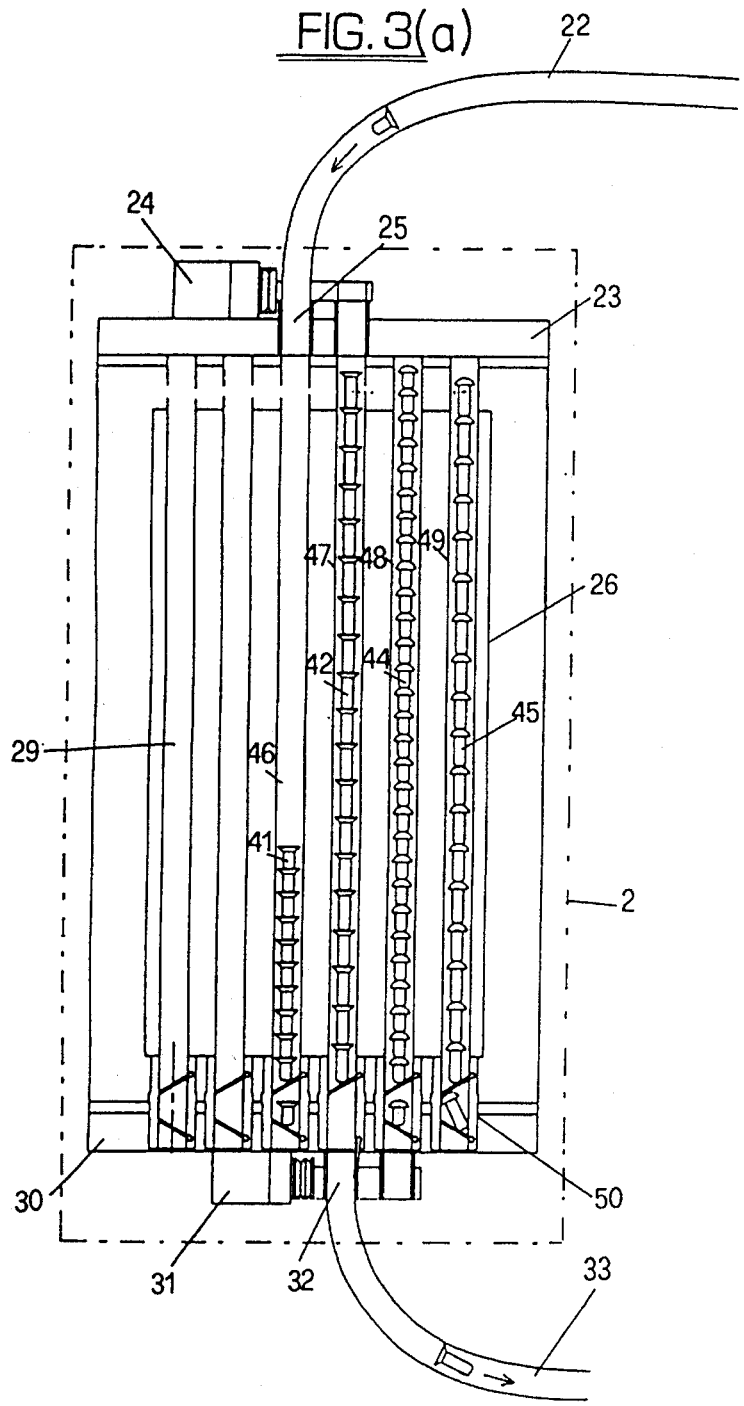
FIGS. 3(a) and 3(b) schematically illustrate the mobile buffer magazine.
Figure 3B:
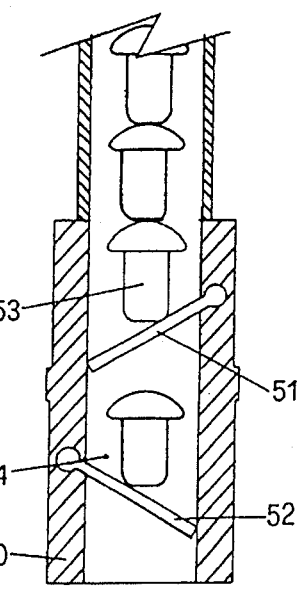

FIGS. 3(a) and 3(b) show the components of mobile buffer magazine 2 schematically. These components include a tube 22 coming from the feed station 1, the upper selecting device 23, the tube bundle 26, the lower selecting device 30 and a tube 33 extending towards the riveting head 4. The tube bundle includes a plurality of vertical tubes 29 four of which 46, 47, 48 and 49 are represented in cross section to show the rivets 41, 42, 44 and 45 stored inside them. It is important to observe that reference numerals 41 and 42 designate rivets of the same kind but of different grip lengths and consequently tubes 46 and 47 are identical but each is assigned to store different rivets; accordingly, reference numerals 44 and 45 also designate rivets of the same kind but with different grip lengths although they are of a different kind than rivets 41 and 42. Consequently, tubes 48 and 49 are identical, containing rivets of different grip lengths but of the same kind and thus are most likely different from tubes 46 and 47 (i.e. have a different inner diameter).

A rivet selector includes an escapement 50 located at the bottom end of each tube 29 of tube bundle 26, and two different opening-closing devices 51 and 52 which are adapted to release one rivet at a time by being synchronously powered by an external actuator (not shown in the Figure). The actuators are mounted inside the distributor 32 of the lower selecting device 30 but, as further explained in greater detail, one single pair of actuators is able to drive the escapement 50 of each tube 29.

Figure 4:
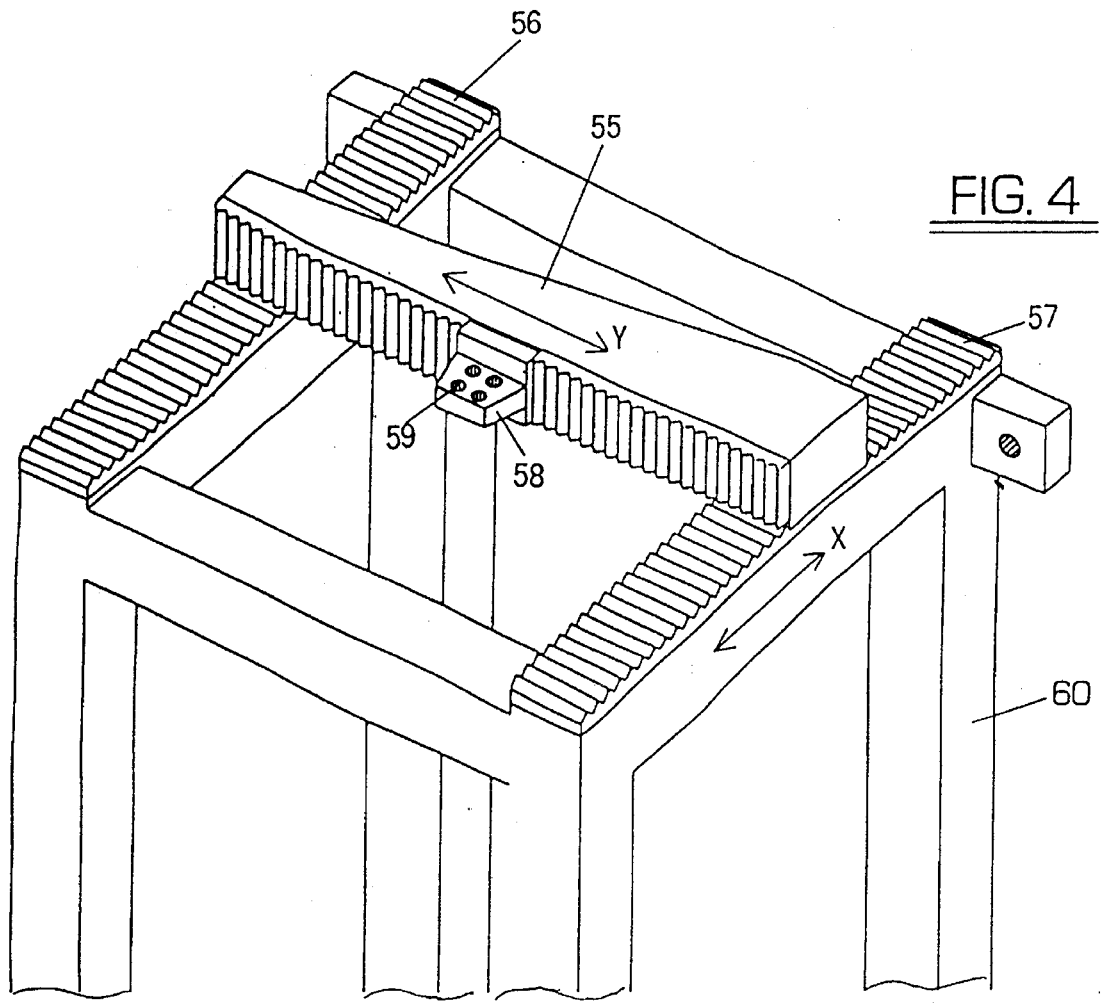
FIG. 4 is a perspective view of a device for selecting rivets in the system of the present invention.

FIG. 4 is a perspective view of the preferred embodiment of the upper selecting device 23 and shows a receiving head 58, a housing 59 for housing tubes 22, a traverse 55 on which the receiving head 58 slides horizontally along the direction Y, rails 56 and 57 on which the traverse 55 slides transversely along the direction X, and a support frame 60.

For the sake of simplicity the structure of the lower selecting device 30 is not shown since it is identical to that of the upper one but is simply mounted upside down at the bottom of the same frame 60.

FIG. 5 is a top view of the buffer magazine which, in addition to comprising the elements shown in FIG. 4, includes a tube bundle comprising one hundred tubes 29 arranged in a 10×10 array. It must be noted that the receiving head 58 arranges four different tubes 22 and each of them can be positioned in coaxial alignment with any one of the one hundred underlying tubes 29 so that when, for example, tube 22 located in the position 63 of the head 58 is aligned with tube 29 located in the position 62 of the buffer magazine, the tube 22 which is located in the position 59 of the head will necessarily occupy the position 61.

In order to allow for all possible combinations of alignment between tubes 22 and tubes 29 it is necessary to establish one empty space perimetrally around the tube bundle by appropriate design of both the frame 60 and the traverse 55 of the selecting devices 23 and 30.

FIG. 6 shows the typical rivet transporting line comprising the track 14 of an orienting device, the related escapement 16, the first tube 17, the booster device 18, a second tube 7, the selecting device 19, three outgoing tubes 20A, 20B and 20C, the decelerating device 21 and the last tube 22A which extends to the upper selecting device 23 of the mobile buffer magazine 2.

The booster device 18 includes an inlet air conduit 69, an annular distribution chamber 67 and oblique passageways 68 through which air is injected into the tube. The selecting device 19 includes a tube housing 70 receiving the tube 7, and a shuttling drawer 71 to which one or more tubes 20A, 20B, 20C is/are conntected, each extending towards a different mobile buffer magazine. The decelerating device 21 has a cylindrical body 64, the inlet of which is connected to one end of tube 20A while the outlet is connected to one end of tube 22A, a plurality of small holes 66 extending radially through body 64, and an outer cylindrical sleeve 65 acting as an exhaust flow regulator (to partially close holes 66). The same Figure also shows magnetic sensors 72 intended to provide feedback for correct rivet transit inside the tube.

Figure 7:
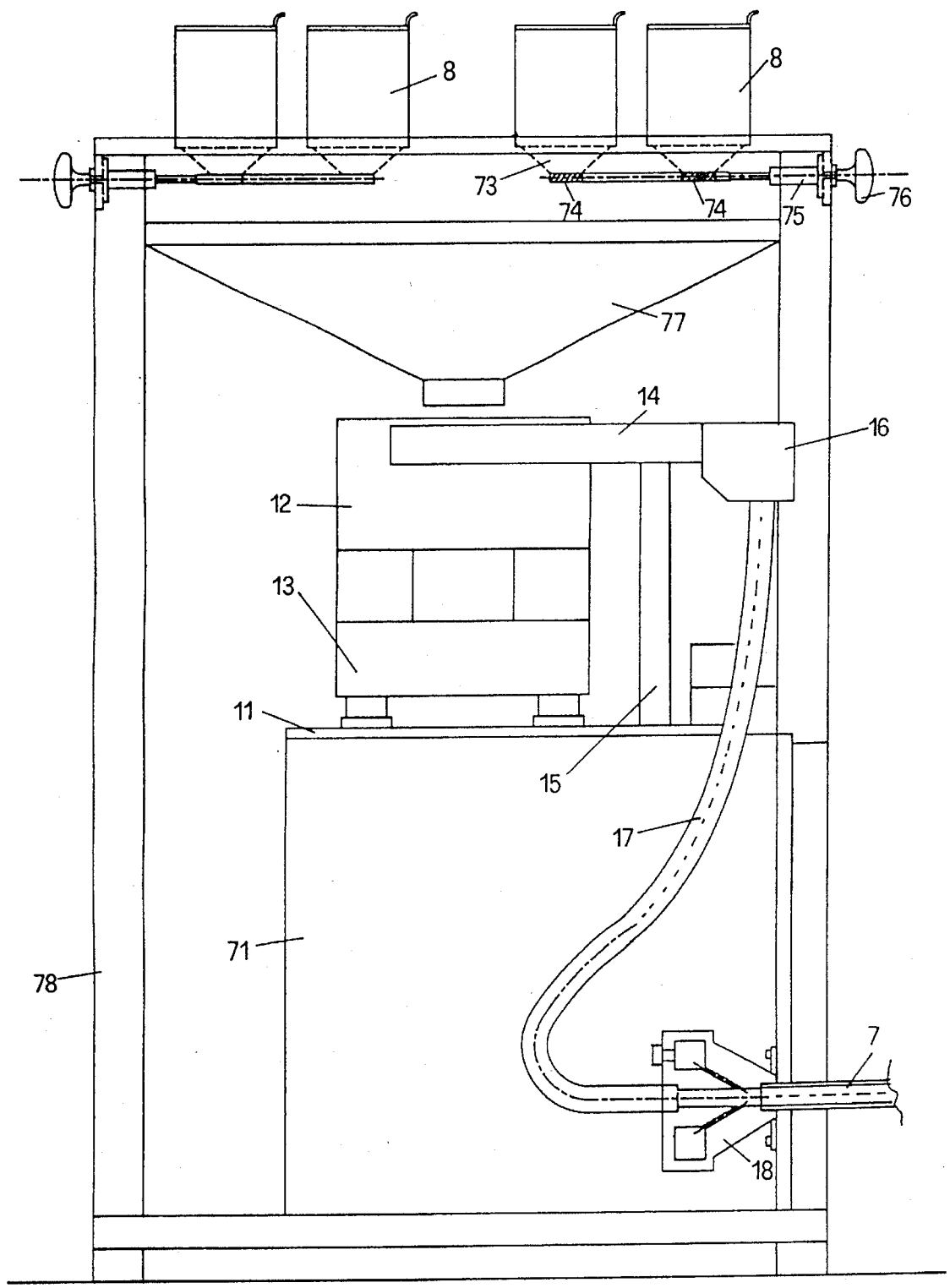
FIG. 7 is a schematic diagram of a main feed station of the system according to the present invention.

FIG. 7 schematically shows the main components of a typical modular unit inside the main rivet feed station. In particular each unit comprises the hoppers 8 with their funnel-shaped ends 73, shuttle valves 74, related pneumatic actuators 75 comprising a knob 76 (to override the pneumatic actuator), a quadrangular hopper 77 serving as a gravity-feed conveyor, and the orienting device 11 shown in FIG. 1.

The same Figure shows as well a supporting element 71 of the orienting device 11 and a supporting frame 78 for the hoppers 8. It is important to note that each different rivet requires its own dedicated hopper 8 while all rivets of the same kind, regardless of their length, are oriented and sent one-by-one from a single orienting device 11. The main feed station 1 thus groups together all hoppers 8 containing rivets of different grip lengths but of the same kind. The group of hoppers containing rivets of the same kind is located above a single orienting device 11 suitable to orient that particular kind of rivet.

Of course, the main feed station 1 will comprise as many modular units as there are different kinds of rivets. The number of units is thus not related to the number of different grip lengths since the latter number only establishes the number of hoppers.

Figure 8A:
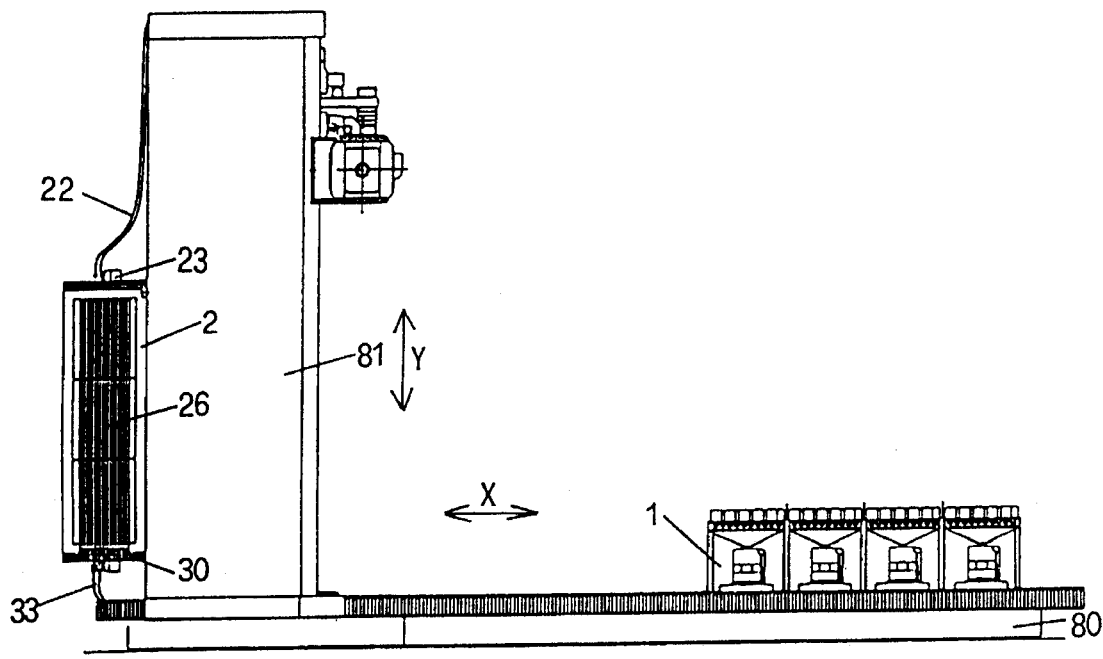
FIGS. 8(a) and 8(b) schematically illustrate a typical application of the system.
Figure 8B:
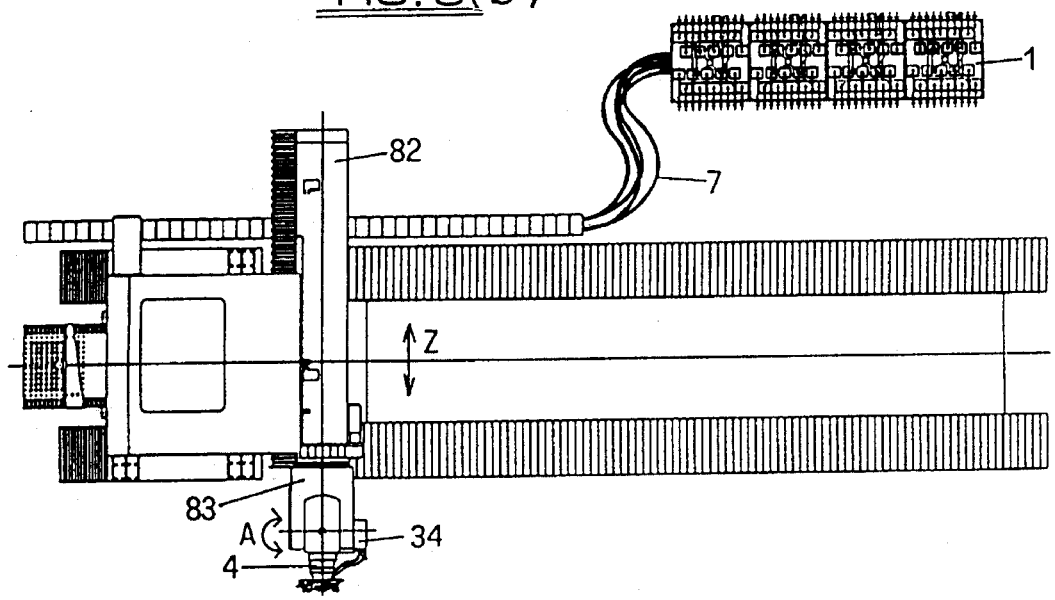

FIGS. 8(*a*) and 8(*b*) are front and top views of a typical application of the present invention in which the system is mounted on a board of an automatic riveting machine comprising, in this particular case, a robot adapted to position and orient the riveting head. These Figures show the main feed station 1 located on the floor in a stationary position, the mobile buffer magazine 2, rivet transporting means constituted by the tubes 7, 22 and 33, and positioning means constituted by the selecting devices 23 and 30.

The Figures also show the main robot components such as a main bed section 80, a mobile column 81, a translating ram 82, and operating head 83, and main robot moving directions X, Y, Z and A.

During normal operation in the automatic mode, the riveting machine is able to exactly finalize, one at a time, the kind and length of the rivet to be installed. The task of quickly delivering to the riveting machine one specifically requested rivet at a time is carried out by the mobile buffer magazine 2 which contains the entire inventory of preoriented rivets or like fasteners. The buffer magazine, usually located on a board of the riveting machine at a small distance from the riveting head, includes a plurality of vertical tubes 29. A limited amount of preoriented identical rivets are stacked one on top of the other inside each tube 29. For each different kind of rivet a certain number of vertical tubes are provided which have an inner diameter slightly greater than the maximum diameter of the head of that particular kind of rivet; at least one of these vertical tubes is dedicated to each different grip length of rivets of the same kind so that the buffer magazine includes at least a number of tubes equal to the number of different rivets necessary for the riveting machine to perform its assembly cycles.

Seeing that the capacity of each tube 29 is necessarily limited, more than one tube can be dedicated to accumulate rivets of the same kind and length, this being particularly convenient for frequently called rivets.

All vertical tubes of the buffer magazine are kept normally full so that the buffer magazine is, at every instant, able to satisfy the rivet calls of the riveting machine.

In case it is necessary to deliver frozen rivets to the riveting machine, some or all of the vertical tubes can be thermally insulated and can be kept chilled, for example, by liquid nitrogen.

The task of refilling the buffer magazine is carried out by the main feed station 1 which keeps the rivet level inside the buffer magazine above a minimum. In fact, whenever rivets inside one of the tubes 29 reach the minimum storage level, the main service station 1 starts to refill that tube sending in sequence a certain number of preoriented rivets identical to the ones contained in tube 29. This can be executed with two different procedures according to alternative arrangements of the main feed station 1.

The first option foresees a main feed station containing an orienting device 11, for example a vibrating bowl, for each different kind and or length of rivet and from which it is directly possible to withdraw, one-by-one, the preoriented rivets necessary to refill the empty tubes 29 from the minimum level to the maximum level. In this case each orienting device 11 is permanently dedicated to a specific kind and length of rivet.

A second option foresees a main feed station containing a certain amount of every different rivet or like fastener, stored in heaps inside hoppers 8.

The hoppers containing rivets of the same kind but of different grip length, are grouped above a single orienting device 11 capable of orienting rivets of the same kind regardless of their length.

A plurality of tubes 10, rather than a single hopper 17, are placed between the hoppers 8 and the orienting device 11 so that, by gravity, it is possible to transfer the contents of one of the hoppers to the orienting device 11. The hoppers 8 contain a preweighted and pre-counted amount of rivets and they are kept filled by an operator; the orienting device 11 is normally empty and off.

That is to say, at least one hopper 8 (containing rivets in heaps) and one tube 29 (containing rivets selected and preoriented) are preassigned to each different rivet and are both kept normally full.

OPERATION

During the automatic operating cycle the riveting machine forwards its instantaneous rivet request in terms of desired kind and length. With reference to FIGS. 1 and 3(*a*), at least one tube 29 of the mobile buffer magazine 2 and one tube 33 are dedicated to each kind of rivet. Consequently, the selecting device 30 moves along its own axes X and Y in order to bring the tube 33 into coaxial alignment with the tube 29 which contains the desired rivets.

At this point a first actuator, located inside the distributor of the device 30, actuates the first device 52 causing the release of a single rivet, more precisely the one inside the expulsion chamber 54 shown in FIG. 3. Under gravity or pneumatically pushed, the rivet enters the underlying tube 33 without loosing its orientation and then reaches the riveting head 4. Once the delivery of the rivet is accomplished, the device 52 is closed while the second opening device 51 is opened allowing the next rivet 54 in the column to descend. Once rivet 53 reaches chamber 54, the device 51 is closed and the escapement 50 is consequently ready for the next delivery.

As the automatic riveting machine continues issuing its rivet requests, the selecting device 30, controlled by the riveting machine continues to withdraw from tubes 29 the requested rivet and consequently the rivet level inside each one of them is decreased.

When the level of rivets in one of the tubes 29 reaches a minimum storage level, the main feed station starts the refilling process. It is to be noted that the minimum level is directly detected by a sensor or it indirectly detected by keeping track of the number of rivets withdrawn so that the rivet level inside each of the tubes 29 can be regulated.

The refilling cycle starts with a positioning of the selecting device 23 during which a respective tube 22, suitable for transporting the kind of rivets contained in the specific tube 29 to be refilled, is brought into coaxial alignment with the latter.

Once the tube 22 has been positioned, the control unit commands the opening of the shuttle valve 9 of hopper 8 containing rivets of the type to be contained by the tube 29 to be refilled. The rivets fall inside tubes 10 and then reach bowl 12 where the orienting cycle is started. All identical rivets are organized in-line on the track 14 and then are released one-by-one in a preoriented relationship into a tube 17. Each of the rivets reaches the booster device 18 which applies a pneumatic thrust thereto. The device 19 directs the thrust rivets towards the selected buffer magazine. Then the device 21 slows the rivets down allowing them to enter the underlying tube bundle 26 with limited speed. This continues until the entire amount of rivets originally contained in hopper 8 is sent to the tube 29; it must be noted that the refilling cycle is carried out while riveting occurs and the number of rivets per minute transferred by the rivet feed station to the buffer is far higher then the number of rivets withdrawn from the buffer by the riveting machine.

The refilling cycle is accomplished and starts again once the rivet level inside another tube 29 becomes lower than the minimum level. If this occurs while the previous refilling cycle for another tube 29 is not yet finished, the request goes on a waiting list and it is carried out once the previous request has been fulfilled.

The system is then ready for the refilling of the next tube 29. Obviously the capacity of the tube 29 to be refilled is equal to or greater than the capacity of the corresponding hopper 8.

As is clear from what has been described above, the system for selecting and automatically delivering rivets according to the present invention represents a consideration improvement in the art since it possesses the following advantages:

- the system, especially when applied to select and automatically deliver a large amount of different kinds and lengths of rivets, is less expensive;
- the system can simultaneously feed more than one riveting machine;
- the system features a very short rivet delivery time regardless of the number of different rivets or like fasteners to be handled; and
- the system is more compact and more reliable compared to prior art systems handling the same amount of different kinds and lengths of rivets.

What is claimed is:

1. A system for selecting and automatically feeding preoriented fasteners to one or more riveting machines, said system comprising:

a respective mobile buffer magazine associated with each riveting machine, and comprising a plurality of stationary individual magazines each configured to contain a plurality of preoriented fasteners of the same kind and the same grip length;

a main feed station remote from said buffer and including a plurality of rivet orienting means each for orienting fasteners from an unorganized stack of fasteners and separating them one-by-one from each other;

first transporting means for transferring fasteners one-by-one from the main feed station to said mobile buffer magazine;

second transporting means for transferring fasteners from the mobile buffer magazine to the automatic riveting machine associated therewith;

said mobile buffer magazine including first positioning means for moving an outlet of said first transporting means into coaxial alignment with an inlet of a desired one of any of said individual;

magazines, and second positioning means for moving an inlet of said second transporting means into coaxial alignment with an outlet of a desired one of any of said individual magazines; and a control unit connected to said plurality of rivet orienting means, and said first and said second positioning means.

2. A system for selecting and automatically feeding preoriented fasteners to one or more riveting machines according to claim 1, wherein said plurality of individual magazines comprises linear tubes arranged parallel to one another in a bundle.

3. A system for selecting and automatically feeding preoriented fasteners to one or more riveting machines according to claim 1, wherein each of said individual magazines comprises a tube configured to contain a stack of the preoriented fasteners, and two opening-closing means at a bottom end of the tube for releasing one fastener at a time from the stack.

4. A system for selecting and automatically feeding preoriented fasteners to one or more riveting machines according to claim 1, wherein said first and second transporting means comprise flexible tubes each having an inner diameter that allows the kind of fastener to which the tube is dedicated to travel inside it and prevents that fastener from losing the orientation originally impressed upon the fastener during its first insertion into the tube.

5. A system for selecting and automatically feeding preoriented fasteners to one or more riveting machines according to claim 1, wherein said first transporting means comprises a tube connected to said mobile buffer magazine, and booster means for injecting compressed air into the tube behind a fastener traveling in the tube.

6. A system for selecting and automatically feeding preoriented fasteners to one or more riveting machines according to claim 5, wherein said first transporting means further comprises a decelerating device including a cylindrical body connected to the tube, said cylindrical body having the same inner diameter as the tube and a plurality of exhaust holes extending radially therethrough, and an exhaust flow regulator means for partial occlusion of said exhaust holes, said decelerating device allowing the speed of the fastener to be reduced due to partial exhaust through said exhaust holes of the compressed air injected behind the fasteners.

7. A system for selecting and automatically feeding preoriented fasteners to one or more riveting machines according to claim 1, wherein said first positioning means includes a head movable along two cartesian axes lying in a plane perpendicular to longitudinal axes of said magazines.

8. A system for selecting and automatically feeding preoriented fasteners to one or more riveting machines according to claim 1, wherein said second positioning means includes a distributor movable along two cartesian axes lying in a plane perpendicular to longitudinal axes of said magazines.

9. A system for selecting and automatically feeding preoriented fasteners to one or more riveting machines according to claim 1, wherein said first transporting means comprises selecting devices for selecting the mobile buffer magazine to which the fasteners coming from the orienting means of the main feed station are addressed.

10. A system for selecting and automatically feeding preoriented fasteners to one or more riveting machines according to claim 1, wherein the main feed station further comprises:
- a plurality of groups of hoppers, externally actuatable valves located at lower ends of said hoppers, respectively, said valves allowing gravity to discharge the entire contents of said hoppers once opened,
- at least one conveyor interposed between each of said groups of hoppers and each respective one of said orienting means,
- actuators for said valves, and
- a supporting frame to which said hoppers and said orienting means are mounted.

11. A system for selecting and automatically feeding preoriented fasteners to one or more riveting machines according to claim 10, wherein said hoppers are located above said orienting means.

12. A system for selecting and automatically feeding preoriented fasteners to one or more riveting machines according to claim 10, wherein said at least one conveyor comprises tubes whose upper ends are connected to the valves, respectively, and whose lower ends are located above said respective one of the orienting means.

13. A system for selecting and automatically feeding preoriented fasteners to one or more riveting machines according to claim 10, wherein said at least one conveyor is a funnel located above said respective one of the orienting means and below a said group of hoppers.

14. A system for selecting and automatically feeding preoriented fasteners to one or more riveting machines according to claim 1, wherein each of said first and said second transporting means comprises a plurality of tubes.

15. A system for selecting and automatically feeding preoriented fasteners to one or more riveting machines according to claim 1, wherein each of said magazines is a vertically extending tube, the inlets of said individual magazines being constituted by the tops of said tubes, respectively, and the outlets of said individual magazines being constituted by the bottoms of said tubes, respectively.

16. A system for selecting and automatically feeding preoriented fasteners to one or more riveting machines according to claim 1, wherein each of said first and said second transporting means is for pneumatically transferring the rivets or like fasteners.

* * * * *